United States Patent
Wörner

(10) Patent No.: US 9,820,562 B2
(45) Date of Patent: Nov. 21, 2017

(54) TOOTHED RACK BRUSH

(71) Applicant: WITTENSTEIN SE, Igersheim (DE)

(72) Inventor: Axel Wörner, Walluf (DE)

(73) Assignee: WITTENSTEIN SE, Igersheim (DE)

( * ) Notice: Subject to any disclaimer, the term of this patent is extended or adjusted under 35 U.S.C. 154(b) by 91 days.

(21) Appl. No.: 14/737,687

(22) Filed: Jun. 12, 2015

(65) Prior Publication Data

US 2015/0367384 A1 Dec. 24, 2015

(30) Foreign Application Priority Data

Jun. 20, 2014 (DE) ........................ 10 2014 108 694

(51) Int. Cl.
| | |
|---|---|
| *A46B 13/02* | (2006.01) |
| *B08B 1/00* | (2006.01) |
| *B08B 1/04* | (2006.01) |
| *F16H 19/04* | (2006.01) |
| *A46B 13/00* | (2006.01) |
| *F16H 55/26* | (2006.01) |

(52) U.S. Cl.
CPC .......... *A46B 13/006* (2013.01); *A46B 13/001* (2013.01); *A46B 13/02* (2013.01); *B08B 1/002* (2013.01); *B08B 1/008* (2013.01); *B08B 1/04* (2013.01); *F16H 19/04* (2013.01); *F16H 55/26* (2013.01)

(58) Field of Classification Search
CPC .......... B08B 1/002; B08B 1/008; B08B 1/04; A46B 13/005; A46B 13/02; A46B 13/001; A46B 13/006; F16H 55/06; F16H 55/281; F16H 19/04; F16H 19/042; B62D 3/12
See application file for complete search history.

(56) References Cited

U.S. PATENT DOCUMENTS

| | | | | |
|---|---|---|---|---|
| 182,439 | A * | 9/1876 | Murphy | F16K 27/02 251/221 |
| 2,693,611 | A * | 11/1954 | Lombardi | A46B 5/06 15/104.09 |
| 5,702,189 | A | 12/1997 | Mizutani et al. | |
| 2012/0186897 | A1* | 7/2012 | Kluge | B62D 3/123 180/444 |

FOREIGN PATENT DOCUMENTS

| | | |
|---|---|---|
| GB | 474371 A | 10/1937 |
| JP | 2001165269 A | 6/2001 |
| JP | 2005003144 A | 1/2005 |

* cited by examiner

*Primary Examiner* — Saeed T Chaudhry
(74) *Attorney, Agent, or Firm* — Meunier Carlin & Curfman LLC

(57) ABSTRACT

Toothed rack brush for cleaning a toothed rack of a toothed rack gear, with a toothed rack, a brush head with a plurality of bristles, which is rotationally arranged about a rotational axis, aligned in parallel to the toothed rack in order to carry out a rotational movement and is arranged in a linearly moveable manner to carry out a relative longitudinal movement relative to the toothed rack, a synchronization device for synchronizing the rotational movement with the longitudinal movement.

11 Claims, 3 Drawing Sheets

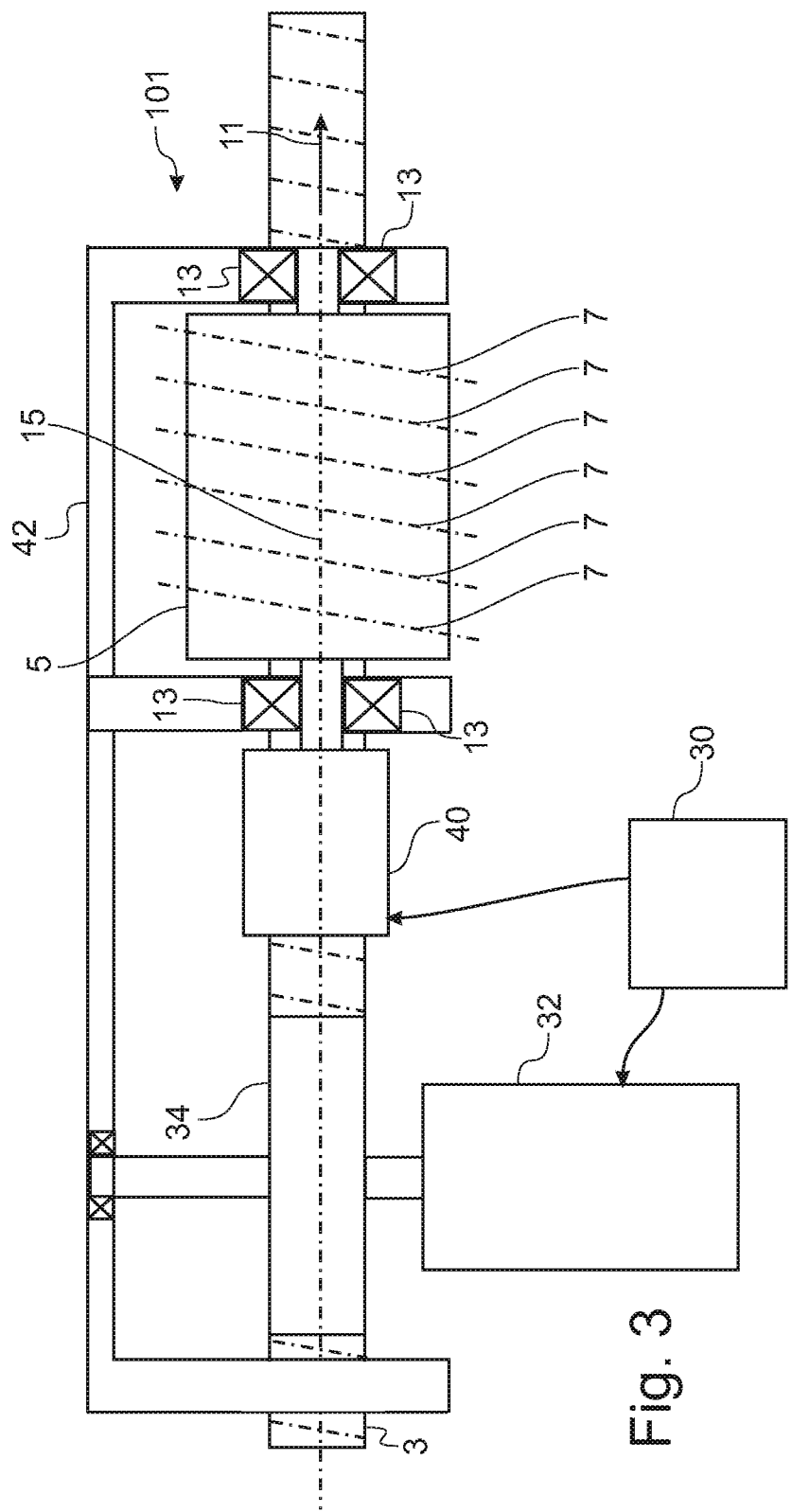

TOOTHED RACK BRUSH

CROSS-REFERENCE TO RELATED APPLICATIONS

This application claims the benefit of German Patent Application No. 102014108694.5, filed on Jun. 20, 2014, the disclosure of which is expressly incorporated herein by reference in its entirety.

FIELD OF THE INVENTION

The invention relates to a toothed rack brush for cleaning a toothed rack and a use of such a toothed rack brush.

PRIOR ART

For the cleaning of toothed racks a device is disclosed in U.S. Pat. No. 5,702,189 that is intended of the cleaning of toothed racks in printers. A plastic element is proposed which is arranged about the toothed rack for removing excess paper residues. At best, such an arrangement is only suitable for cleaning toothed racks of a rack and pinion actuator in automation or production technology.

Toothed rack brushes in accordance with the prior art clean toothed racks with room for improvement and are only suitable for toothed racks made of metal or a cumbersome to operate.

DISCLOSURE OF THE INVENTION

The aim of the invention is to provide an improved toothed rack brush and a use of such a toothed rack brush, whereby in particular, effective cleaning of a toothed rack is to be brought about.

This aim is achieved with a toothed rack brush according to claim 1 and a use of a toothed rack brush according to the sub-claims.

Typical embodiments of the invention comprise a toothed rack and a brush head. The brush head has a plurality of bristles which can be turned about an axis of rotation of the brush head. The brush head has an axis of rotation which is parallel to the relative direction of the longitudinal movement of the toothed rack. This corresponds with the direction in which a pinion and the toothed rack move relative to one another. In principle, for the form of embodiment of the invention it does not matter whether the toothed rack is moved with the pinion or whether the toothed is fixed and the pinion moves along the toothed rack on rotation of the pinion. In general this direction of this relative longitudinal movement is called the direction of longitudinal movement or direction of linear movement, whereby the brush head is arranged so that relative to the toothed rack it can be linearly displaced in this direction. At the same time the rotational axis of the brush head is aligned in this direction so that the bristles can turn about a parallel of the direction of longitudinal movement.

In typical embodiments the toothed rack is made of metal, for example, steel or a titanium alloy. Typically, in some embodiments lubrication of the toothed rack with oil is envisaged. Other embodiments use other lubricants or do not use any lubrication.

Typical embodiments comprise a synchronisation device for synchronising the rotational movement with the longitudinal movement. In the case of a toothed rack with helical teeth the synchronisation device is typically arranged so that on rotation of the brush head about its axis of rotation the bristles are set in motion in such a way that the brushes at least essentially move along the teeth or in parallel to the tooth flanks of the toothed rack. In pictorial terms this can be described as a worm combing a worm gear. However, instead of the worm gear the toothed rack is combed. In order to synchronise this movement a synchronisation device is typically provided. The background to this is that in contrast to a worm gear, the interaction between the brush head with the bristles and the toothed rack is not of a type that simple sliding along of the brush head suffices to actuate a corresponding movement. In typical embodiments the self-retention forces are too great for this.

Typical embodiments comprise a brush head with a plurality of bristles wherein the bristles are arranged along a helix. The helix can also be described as a screw line. Typical embodiments have helical teeth with a helix angle. Typically the lead angle of the helix corresponds to the lead angle of the toothed rack by 5° or at least 2° precisely or at least essentially, where "essentially" typically means a deviation of max. 10% or max. 1°.

In some embodiments of the invention the toothed rack comprises straight toothing. In typical embodiments, for cleaning of a toothed rack with straight toothing, groups of bristles jointly arranged in the circumferential direction are located at intervals from one another on the brush head. The rotational movement is typically synchronised with the longitudinal movement in such a way that in each case one group of bristles cleans a tooth base with adjoining tooth flanks. In this way kinking of the bristles during the relative movement in the longitudinal direction is avoided.

In typical embodiments of toothed racks with straight toothing, the speed of the rotational movement of the brush head is selected to be as high as possible in order to achieve a low relative speed of the bristles in the longitudinal direction in relation to the toothed rack. In such embodiments, during a movement of the toothed rack in the longitudinal direction the synchronisation device is set up to drive the brush head with a defined speed, which is typically very high, normally more than twenty revolutions per second or more than fifty revolutions per second.

In embodiments with a helical toothed rack the synchronisation device is typically set up to synchronise the rotational movement with the longitudinal movement in such a way that the relative speed of the bristles to that of the toothed rack in the direction of longitudinal movement of the of the toothed rack is a low as possible. As described above, this is typically achieved that in an analogue manner to a worm gear the rotational movement is synchronised with the longitudinal movement.

Typical embodiments of the synchronisation device have a toothed element which is coupled to the brush head and which is in effective connection with the actuator of the toothed rack gear. In typical embodiments, the actuator of the toothed rack gear is indirectly connected to the brush head in order to drive the brush head in a rotational manner. An example of an actuator of the toothed rack gear is an electric motor, which, via an optional gear, drives a pinion, which is in turn is in engagement with the toothed rack so that a movement of the pinion relative to the toothed rack is brought about. Typically the synchronisation device has a toothed element which is coupled to the brush head and which is directly or indirectly in effective connection with the actuator, for example the toothed element picks up a rotation of the pinion or a shaft. In such embodiments the synchronisation device typically has gearing which is designed in such a way that the rotational movement of the brush head is synchronised with the longitudinal movement, typically so that the bristles move along the base of the teeth or along the heads of the teeth or are engaged with the toothed rack in a similar way to worm gearing.

In typical embodiments the teeth of the toothed rack engage with the toothed element in order to rotationally actuate a longitudinal movement of the brush head relative to the toothed rack. A possible example of an indirect connection of the actuator of the toothed rack gear with the brush head comprises a toothed element which picks up a movement in the longitudinal direction of the toothed rack relative to the brush head, for example in the form of a gearwheel which engages with the toothed and is borne in an manner that is immovable in the longitudinal direction relative to the brush head. Typically the synchronisation device in embodiments comprises a bevel gear, wherein the toothed element as a helical gearwheel picks up the relative longitudinal movement of the toothed rack and converts it via the bevel gear into rotation of the brush head, wherein in typical embodiments there is an optional intermediate gear in order to synchronise the rotational movement with the longitudinal movement. Synchronisation can also take place through selecting the tooth ratios of the gearwheels and bevel wheels.

In further embodiments the toothed element engages with an output of the actuator, for example, with the pinion or shaft which drives the pinion. In such embodiments too, in typical synchronisation devices a bevel gear with possibly an additional reduction gear is used in order to synchronise the rotational movement with the longitudinal movement.

Typical embodiments comprise a synchronisation device with a brush head actuator, which is connected to a control device of an actuator of the toothed rack gear. In turn the actuator of the toothed rack gear can be, for example an electric machine, which drives a pinion, wherein the pinion can be moved linearly relative to the toothed rack. The term "actuator of the toothed rack gear" can thus relate to a fixed toothed rack along which the actuator with the pinion moves. This is also what is understood by the term "actuator of the toothed rack gear". Unless otherwise set out, this applies to the whole description. In embodiments the synchronisation device is an electronic synchronisation device, which is designed to operate the brush head actuator in such a way that its speed brings about a rotational movement of the brush head with which the brush head is synchronously engaged with the toothed rack in an manner analogue to worm gearing. However, in embodiments with an electronic synchronisation device there is typically no mechanical gear meshing of the actuator of the toothed rack gear to the axis of rotation of the brush head. In embodiments a brush head actuator is typically envisaged which brings about the rotational movement of the brush head in a mechanically independent manner, i.e. is typically connected with the brush head at most with a reduction gear in order to rotational drive the brush head.

Typical embodiments have a lubrication pinion which is provided for applying a lubricant to the toothed rack. Typically the lubrication pinion is provided at different points along the toothed rack from the toothed rack brush, for example before or behind the toothed rack brush in the longitudinal direction of the toothed rack.

Typical embodiments comprise a brush head, which has bristles made of plastic or steel. Plastic has the advantage of cheaper production and steel the advantage of less wear.

A further aspect of the invention relates to the use of a toothed rack brush in one of the embodiments described herein for cleaning a toothed rack.

BRIEF DESCRIPTION OF THE DRAWINGS

Further advantages and features of typical embodiments of the invention are described below with the aid of the attached drawings, in which

FIG. 3 shows a schematic diagram of a further form of embodiment.

DESCRIPTION OF PREFERRED EXAMPLES OF EMBODIMENT

The individual figures are not described in full in each case as they partially show the same form of embodiment or similar embodiments. More particularly, the same components are not described again in connection with new figures. Instead, reference is made to the corresponding description with the corresponding reference numbers.

Figure 1:
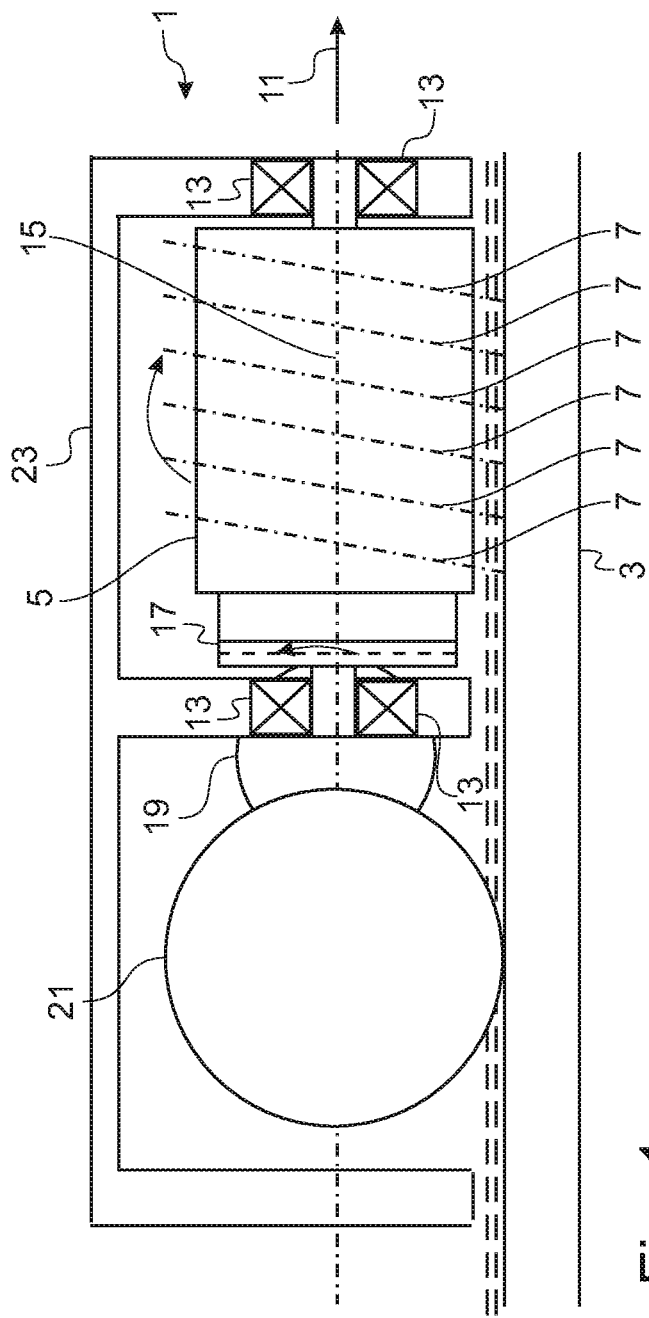
FIG. 1 shows a schematic side view of a typical form of embodiment of a toothed rack brush.

FIG. 1 shows a schematic side view of a typical form of embodiment of a toothed rack brush 1. The toothed rack brush 1 comprises a toothed rack 3 and a brush head 5 for cleaning of the toothed rack 3. The brush head 5 has bristles 7 arranged in a helix which are only schematically indicated by lines. The bristles 7 comprise plastic sticks combined into bundles. In this respect the bristles 7 do not fundamentally differ from the bristle of other brushes. However the bristle 7 or the helix of bristles 7 exhibit(s) a gradient along the brush head 5 which corresponds to a helix angle of the helical teeth or helically toothed rack 3. In this way, during a longitudinal movement of the toothed rack 3 relative to the brush head 5, it is possible to synchronise a rotational movement of the brush head 5 with the longitudinal movement.

The longitudinal movement takes place as a relative longitudinal movement of the brush head 5 relative to the toothed rack 3 along a direction that is indicated with a longitudinal direction arrow 11. The brush head 5 is rotationally borne by bearing 13 about a rotational axis 15 which is aligned in parallel to the longitudinal direction arrow 11.

The brush head 5 is rotated via a bevel gear, wherein a first bevel wheel 17 is arranged on the rotational axis 15 of the brush head 5 and is connected to the brush head in a rotation-proof manner. The first bevel wheel 17 engages in a second bevel wheel 19 (only shown schematically in FIG. 1 as it is concealed), wherein the second bevel wheel 19 in turn engages with a toothed element 21. Together the two bevel wheels 17 and 19 form a bevel gear which via a toothed element 21 is rotationally coupled with the brush head 5. The toothed element 21 engages with the second bevel wheel 19 and the helical toothed rack 3. Like the toothed rack 3, the toothing of the toothed element 21, which engages with the toothing of the toothed rack 3 is helical.

The transmission ratio of the toothed element 21 and the bevel wheels 17 and 19 is such that the brush head 5 performs a synchronised rotational movement with the longitudinal movement of the toothed rack 3 relative to the brush head 5. In this way the toothing element 21 as well as the bevel wheels 17 and 19 form a synchronisation device for synchronising the rotational movement with the longitudinal movement. The synchronisation is typically such that the brush head 5 engages like a worm of a worm gearing with the toothing of the toothed rack 3. The movement of the bristles along the tooth flanks and the tooth heads of the teeth of the toothed rack brings about a cleaning effect. The cleaning effect is particularly advantageous as the bristles are not moved perpendicularly to the teeth but in the longitudinal direction of the tooth heads and they thereby also reach the tooth bases. Typically the rotational movement and the translation movement are synchronised in such a way that the bristles are moved at intervals on a circular line in parallel to the tooth base.

The brush head 5, the bevel wheels 17 and 19 as well as the toothed element 21 are accommodated in a frame 23 which is connected in a fixed manner with a pinion or a pinion drive, more precisely said in a housing of a pinion drive or a bearing device of the pinion. The pinion drive corresponds to the actuator of the toothed rack gear. The pinion brings about the force transfer between the torque of the actuator of the toothed rack gear and of the toothed rack.

Figure 2:
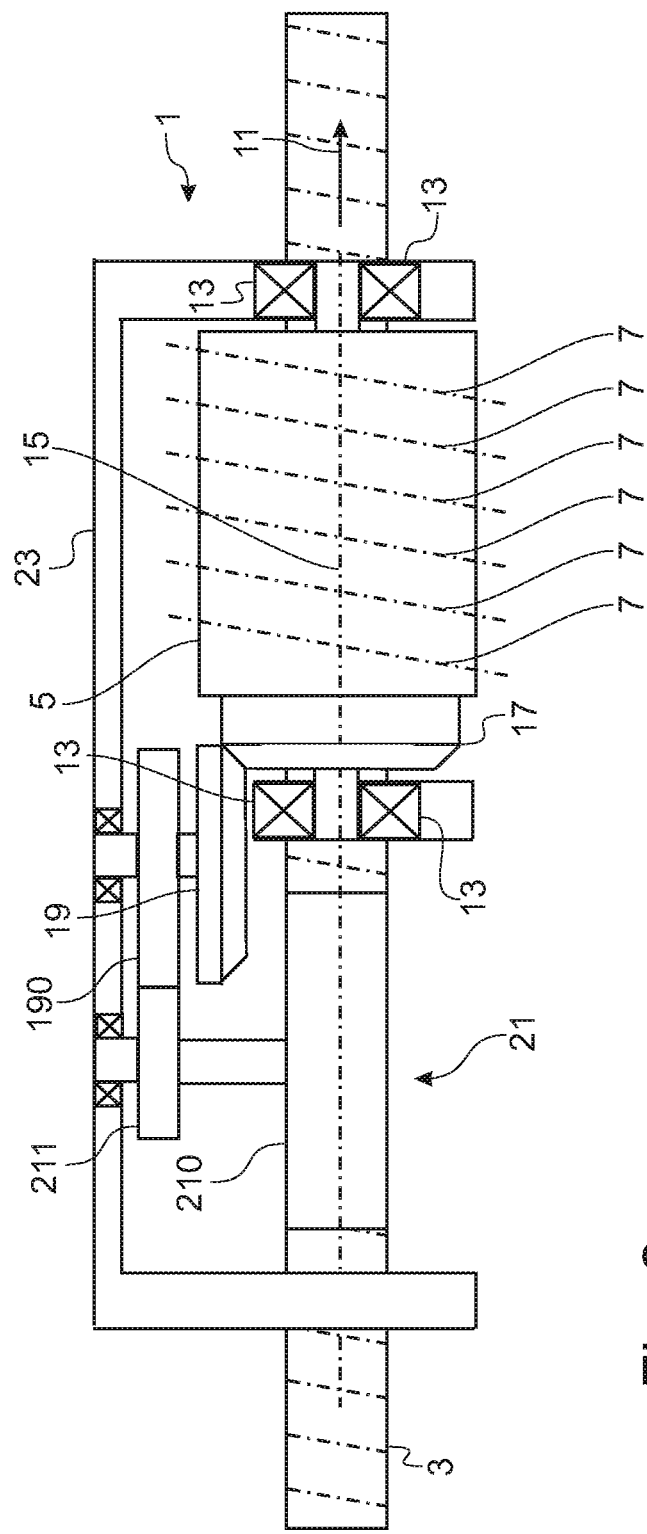
FIG. 2 shows a view from above of the typical form of embodiment of FIG. 1.

FIG. 2 shows the form of embodiment in FIG. 1 in a schematic view from above, whereby the same reference number designate the same components so that the individual components are not explained again. It can be seen that the toothing element 21 has two gearwheels 210 and 211 wherein the gearwheel 210 is a helically-toothed gearwheel which engages with the toothing of the toothed rack 3. The second gearwheel 211 of the toothing element 21 is connected to the first gearwheel 210 of the toothing element 21 in a fixed manner. The second gearwheel 211 of the toothing element 21 engages with a drive gear 190, which is turn is connected in a fixed manner to the second bevel wheel 19. Through this the torque and rotational movement are transferred from the toothing element 21 to the second bevel wheel 19 which with the first bevel wheel 17 form an angular gear for transferring the rotational movement and the torque to the brush head 5.

The form of embodiment shown in FIGS. 1 and 2 can also be described as a form of embodiment with a mechanical synchronisation device, wherein the mechanical synchronisation device comprises the toothing element 21 with the gearwheels 210 and 211 as well as the angular gear with the bevel wheels 17 and 19 and the drive gear 190. Overall this results in a transmission which brings about a synchronisation of the rotational movement of the brush head 5 with the longitudinal movement of the brush head 5 relative to the toothed rack 3.

FIG. 3 shows another form of embodiment of a toothed rack brush 101 with an electronic synchronisation device whereby the electronic synchronisation comprises a control device 30. Again, for the same or similar components as in the form of embodiment of FIGS. 1 and 2 the same reference numbers are used and not explained again in more detail.

The control device 30 controls an actuator 32 of the toothed rack gear. The actuator 32 of the toothed rack gear is rotationally connected with a pinion 34 which engages with a toothed rack 3.

The toothed rack brush 101 of FIG. 3 also comprises a brush head actuator 40 which is in the form of an electric machine. The form of embodiment of the toothed rack brush 101 of FIG. 3 comprises two electric machines, namely the electric machine of the drive 32 of the toothed rack gear and the electric machine of the brush head actuator 40. The brush head-actuator 40 as well as the actuator 32 of the toothed rack gear are both controlled by the central control device 30. In embodiments with intermediate gear, the brush head actuator 40 is rotationally connected to the brush head 5. Through appropriate control of actuator 32 and of the brush head actuator 40 the speeds of the actuator 32 and of the brush head actuator 40 are matched in such a way that the brush head 5 carries out a rotational movement synchronised with the longitudinal movement of the toothed rack relative to the brush head 5. The actuator 32, the brush head 5 and the brush head actuator 40 are accommodated and connected to each other in a joint frame 42 so that a relative movement of the toothed rack 3 to the actuator 32 or the pinion 34 brings about a exactly equal longitudinal movement of the toothed rack 3 relative to the brush head 5. The synchronisation in turn takes place in such a way that the rotational movement the brush head 5, which has a plurality of bristles 7 arranged in a helix interacts with the relative longitudinal movement of the toothed rack 3 like the worm of a worm gear.

Dimensions of a typical example of embodiment are for example a diameter of the brush head of 60 mm, a length of the brush head of 100 mm, a bristle height of 15 mm, wherein the bristles are arranged helically with an anticlockwise gradient of 19.52° in 3-threads. 6-threads or 2-threads are also possible. The cleaned toothed rack has a width of 29 mm and a lead angle of the helical toothing of 19°.

The invention has been described with reference to typical embodiments with the aid of the figures, whereby the invention is not restricted to the examples of embodiment, but the scope of the invention is determined by the claims.

The invention claimed is:

1. A toothed rack brush for cleaning a toothed rack of a toothed rack gear comprising:
    a toothed rack;
    a brush head with a plurality of bristles, wherein the brush head is rotationally arranged about a rotational axis, aligned in parallel to the toothed rack in order to carry out a rotational movement,
    wherein the brush head is further arranged in a linearly moveable manner relative to the toothed rack in a longitudinal direction of the toothed rack to carry out a relative longitudinal movement relative to the toothed rack; and
    a synchronisation device for synchronising the rotational movement with the longitudinal movement, said synchronisation device comprising a toothed element which is coupled to the brush head and is in effective connection with an actuator of the toothed rack gear.

2. The toothed rack brush according to claim 1, wherein the bristles are arranged along a helix.

3. The toothed rack brush according to claim 2, wherein the toothed rack has helical teeth with a helix angle.

4. The toothed rack brush according to claim 3. wherein the lead angle of the helix at least essentially corresponds to the helix angle of the toothed rack.

5. The toothed rack brush according to claim 1, wherein the toothed element engages with the teeth of the toothed rack in order to rotationally drive the brush head in a longitudinal direction of the brush head relative to the toothed rack.

6. The toothed rack brush according to claim 1 wherein the toothed element engages with a take-off of an actuator of the toothed rack gear in order to drive the brush head.

7. The toothed rack brush according to claim 1, wherein the toothed element is coupled to the brush head via a bevel gear.

8. toothed rack brush for cleaning a toothed rack of a toothed rack gear comprising:
    a toothed rack;
    a brush head with a plurality of bristles, wherein the brush head is rotationally arranged about a rotational axis, aligned in parallel to the toothed rack in order to carry out a rotational movement,
    wherein the brush head is further arranged in a linearly moveable manner relative to the toothed rack in a longitudinal direction of the toothed rack to carry out a relative longitudinal movement relative to the toothed rack; and a synchronisation device for synchronising the rotational movement with the longitudinal movement, wherein the synchronisation device comprises a brush head actuator connected to a control device of an actuator of the toothed rack gear.

9. The toothed rack brush according to claim 8, wherein the bristles are arranged along a helix.

10. The toothed rack brush according to claim 9, wherein the toothed rack has helical teeth with a helix angle.

11. The toothed rack brush according to claim 10, wherein the lead angle of the helix at least essentially corresponds to the helix angle of the toothed rack.

* * * * *